(12) United States Patent
Desai et al.

(10) Patent No.: US 7,993,102 B2
(45) Date of Patent: Aug. 9, 2011

(54) ROTOR COOLING CIRCUIT

(75) Inventors: Tushar S. Desai, Bangalore (IN); Roger Clayton Walker, Piedmont, SC (US); Richard Francis Gutta, Greer, SC (US); Fernando J. Casanova, Simpsonville, SC (US); Ravi Meenaksh, Greenville, SC (US)

(73) Assignee: General Electric Company, Schenectady, NY (US)

( * ) Notice: Subject to any disclaimer, the term of this patent is extended or adjusted under 35 U.S.C. 154(b) by 471 days.

(21) Appl. No.: 12/351,408

(22) Filed: Jan. 9, 2009

(65) Prior Publication Data

US 2010/0178168 A1 Jul. 15, 2010

(51) Int. Cl.
*F01D 5/18* (2006.01)
*F01D 5/08* (2006.01)
*F01D 5/20* (2006.01)
(52) U.S. Cl. .............. 416/97 R; 416/95; 416/1
(58) Field of Classification Search .......... 416/97 R, 416/95, 1
See application file for complete search history.

(56) References Cited

U.S. PATENT DOCUMENTS

| 5,211,407 | A | | 5/1993 | Glynn et al. |
| 5,211,533 | A | | 5/1993 | Walker et al. |
| 5,593,274 | A | | 1/1997 | Carreno et al. |
| 5,685,158 | A | * | 11/1997 | Lenahan et al. ............. 60/726 |
| 5,695,319 | A | * | 12/1997 | Matsumoto et al. ......... 416/95 |
| 5,853,285 | A | | 12/1998 | Miller et al. |
| 6,053,697 | A | | 4/2000 | Piekarski et al. |
| 6,185,924 | B1 | * | 2/2001 | Matsumoto et al. ......... 60/806 |
| 6,234,746 | B1 | * | 5/2001 | Schroder et al. ............ 415/115 |
| 6,331,097 | B1 | * | 12/2001 | Jendrix ..................... 416/96 R |
| 6,382,903 | B1 | * | 5/2002 | Caruso et al. ................ 415/1 |
| 6,491,495 | B1 | * | 12/2002 | Marushima et al. ....... 416/96 R |
| 2001/0006601 | A1 | * | 7/2001 | Wilson et al. ............... 416/95 |
| 2003/0035727 | A1 | * | 2/2003 | Marushima et al. ....... 416/97 R |
| 2009/0074589 | A1 | * | 3/2009 | Fang et al. ................ 416/97 R |

* cited by examiner

*Primary Examiner* — David Zarneke
(74) *Attorney, Agent, or Firm* — Nixon & Vanderhye P.C.

(57) ABSTRACT

A cooling circuit serves to provide cooling air in a rotor having a compressor rotor and a turbine rotor. The cooling circuit includes a first cooling path through the compressor rotor in series with a second cooling path through the turbine rotor such that one amount of cooling air is used for cooling both the compressor rotor and the turbine rotor. The construction enables a reduction in cooling air requirements, thereby increasing power plant efficiency.

11 Claims, 1 Drawing Sheet

9H BL-1 Configuration

ROTOR COOLING CIRCUIT

BACKGROUND OF THE INVENTION

The present invention relates to rotor cooling and, more particularly, to a rotor cooling circuit including combined compressor cooling and turbine cooling to thereby increase efficiency and total power output.

In a gas turbine, the unit rotor during its full load operation experiences temperatures higher than the material capability. As such, the rotor components are subject to low cycle fatigue (LCF), embrittlement and creep issues, which are detrimental to the performance of the system. The unit rotor wheels require a positive purge system to cool the wheels during full load operation. The rotor purge also maintains uniform wheel temperatures during startup and shutdown to achieve good wheel to wheel behavior.

Typically, the unit rotor receives cooled cooling air (CCA) through the compressor discharge casing (CDC) and the inner barrel. This flow is channeled from the aft end of the compressor cavity, down through the air-tubes in the distance piece into the centerline of the unit rotor. The cooling flow is split at the bore section forward for the compressor rotor cooling and aft for the turbine rotor cooling. The amount of flow going to each circuit is controlled at the flange or the rabbet joints through design features such as metering slots. See FIG. 1.

This cooling scheme uses an excess amount of CCA, which impacts the overall efficiency of the machine and the final power output. Additionally, the greater amount of cooling flow requires a larger size heat exchanger, which also results in an efficiency loss in the overall scheme of the system.

It would be desirable to improve the efficiency and power output of the overall system by modifying the CCA rotor-cooling scheme.

BRIEF DESCRIPTION OF THE INVENTION

In an exemplary embodiment, a cooling circuit is provided for cooling a rotor having a compressor rotor and a turbine rotor. The cooling circuit includes a source of cooled cooling air. A first cooling path is defined through openings in rotor wheels of the compressor rotor. The first cooling path directs the cooled cooling air across the rotor wheels and into a bore section of the compressor rotor. A second cooling path in series with the first cooling path directs the cooled cooling air across rotor wheels of the turbine rotor.

In another exemplary embodiment, a method of cooling a rotor includes the steps of directing cooled cooling air along a first cooling path defined through openings in rotor wheels of the compressor rotor, the cooled cooling air being directed across the rotor wheels and into a bore section of the compressor rotor; and directing the cooled cooling air from the first cooling path along a second cooling path in series with the first cooling path, the cooled cooling air being directed across rotor wheels of the turbine.

In yet another exemplary embodiment, a cooling circuit includes a first cooling path through the compressor rotor in series with a second cooling path through the turbine rotor such that one amount of cooling air is used for cooling both the compressor rotor and the turbine rotor.

DETAILED DESCRIPTION OF THE INVENTION

Figure 1:
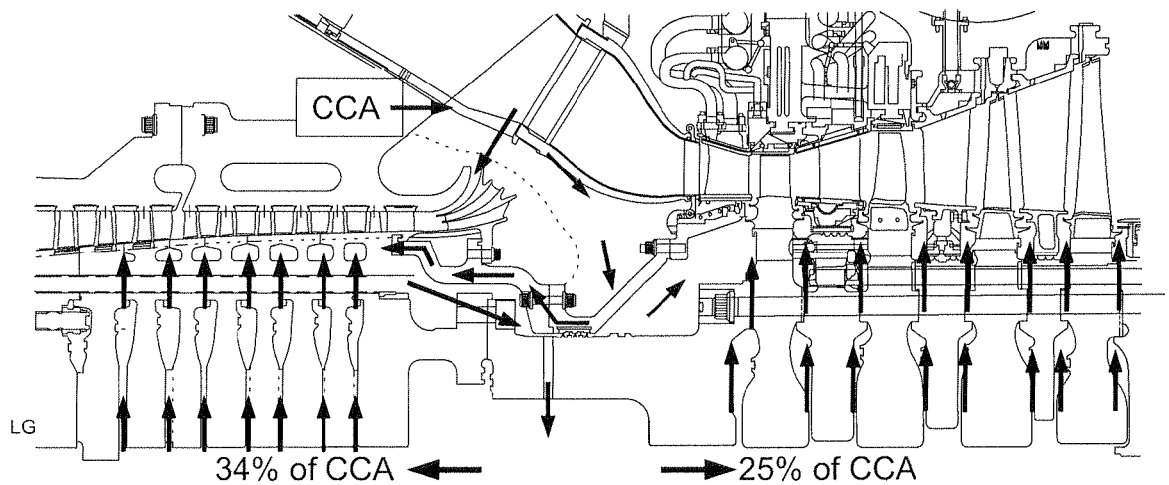
FIG. 1 is a cross sectional view of a conventional cooling circuit in a gas turbine.
Figure 2:
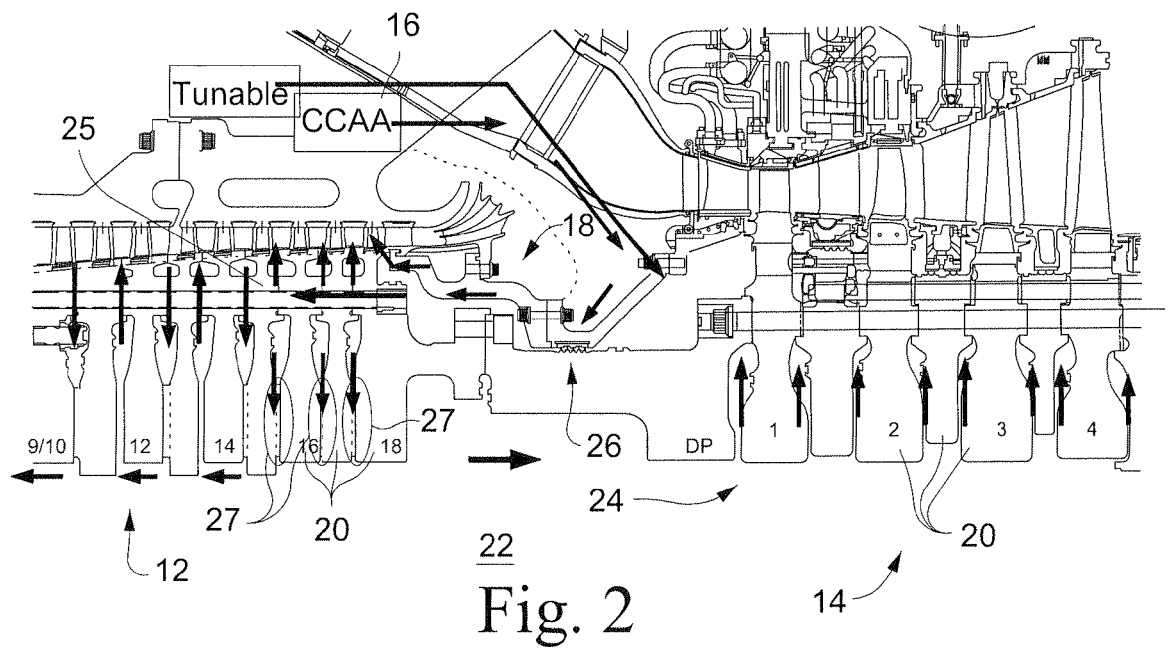
FIG. 2 illustrates the cooling circuit of the described embodiment.

FIG. 2 is a cross sectional view of a gas turbine including the cooling circuit of the described embodiment. A unit rotor in the gas turbine includes a compressor rotor 12 and a turbine rotor 14. The cooling circuit includes a source of cooled cooling air 16, which is routed through the compressor discharge casing (CDC) via a heat exchanger upstream of the unit rotor.

The cooling circuit includes a first cooling path 18 defined through openings in rotor wheels 20 of the compressor rotor 12. The first cooling path 18 directs the cooled cooling air across the rotor wheels 20 and into a bore section 22 of the compressor rotor 12.

A second cooling path 24 is defined in series with the first cooling path 18. The second cooling path 24 directs the cooled cooling air across rotor wheels 20 of the turbine rotor 14.

A small amount of compressor discharge flow (to be used for rotor cooling) is routed to the rotor through the CDC extraction port to the heat exchanger skid and cooled. This flow is used as the cooled cooling air (CCA) and used for rotor cooling. The heat extracted from this cooling flow in the heat exchanger is used to improve the efficiency of the steam turbine.

In particular, the cooling flow in the first cooling path 18 is directed through a plurality of axial holes in the inertia belt 25 for compressor rotor cooling. In an exemplary embodiment, the inertia belt includes twenty-four axial holes. The remaining CCA flow is directed across the high pressure packing (HPP) brush seal 26, bypass holes across the HPP seals, and the stage-18 compressor aft rim. The cooling flow in the compressor rotor inertia belt 25 is split at the compressor flanges for rim cooling, bore cooling and forward stage cooling using metering circuits or the like. High performance impellers 27 in the bore sections of the compressor wheels help maintain the flow pressure and swirl the flow to rotor speed. Flow from the compressor stages is collected and combined at the centerline of the unit-rotor in the bore section 22 and channeled aft toward the second cooling path 24 for cooling the turbine rotor 14.

The compressor stages 13 and 15 are converted to solid bores and cooled through individual parallel flow path cooling circuits.

The CCA system has a bypass around the heat exchanger (controlled by valves or the like) during the startup to achieve better wheel to wheel behavior and improved LCF and fracture life in the rotor wheels.

Combining the cooling flow circuits into first and second series cooling circuits serves to increase the overall efficiency of the system and to reduce the heat exchanger size. The combined rotor cooling flow thus performs double duty by first cooling the compressor rotor and using the same flow to cool the turbine rotor. The new cooling scheme maintains the external control of the system and reduces the total amount of CCA required for rotor cooling by 35%. The design not only reduces the cost of the heat exchanger skid, but as determined by theoretical calculation improves the net combined efficiency of the system by 0.138%.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A cooling circuit in a rotor including a compressor rotor and a turbine rotor, the cooling circuit comprising:
    a source of cooled cooling air;
    a first cooling path defined through openings in rotor wheels of the compressor rotor, the first cooling path directing the cooled cooling air across the rotor wheels and into a bore section of the compressor rotor; and
    a second cooling path in series with the first cooling path, the second cooling path directing the cooled cooling air across rotor wheels of the turbine rotor.

2. A cooling circuit according to claim 1, wherein the first cooling path is defined by axial holes formed in an inertia belt of the compressor rotor wheels.

3. A cooling circuit according to claim 2, wherein the first cooling path directs the cooled cooling air across a high pressure packing brush seal, through bypass holes in the high pressure packing brush seal, and across an aft rim of a stage 18 compressor wheel.

4. A cooling circuit according to claim 1, wherein the first cooling path comprising a plurality of metering circuits in the compressor rotor wheels, the metering circuits distributing the cooled cooling airflow at compressor flanges for rim cooling, bore cooling and forward stage cooling.

5. A cooling circuit according to claim 1, further comprising impellers in the compressor bore section, the impellers maintaining flow pressure and swirling the cooled cooling airflow to rotor speed.

6. A method of cooling a rotor including a compressor rotor and a turbine rotor, the method comprising:
    directing cooled cooling air along a first cooling path defined through openings in rotor wheels of the compressor rotor, the cooled cooling air being directed across the rotor wheels and into a bore section of the compressor rotor; and
    directing the cooled cooling air from the first cooling path along a second cooling path in series with the first cooling path, the cooled cooling air being directed across rotor wheels of the turbine.

7. A method according to claim 6, wherein the first cooling path directs the cooled cooling air across a high pressure packing brush seal, through bypass holes in the high pressure packing brush seal, and across an aft rim of a stage 18 compressor wheel.

8. A method according to claim 6, wherein the first cooling path comprising a plurality of metering circuits in the compressor rotor wheels, the method further distributing the cooled cooling airflow via the metering circuits at compressor flanges for rim cooling, bore cooling and forward stage cooling.

9. A method according to claim 6, further comprising maintaining flow pressure and swirling the cooled cooling airflow to rotor speed using impellers in the compressor bore section.

10. A cooling circuit in a rotor including a compressor rotor and a turbine rotor, the cooling circuit comprising a first cooling path through the compressor rotor in series with a second cooling path through the turbine rotor such that one amount of cooling air is used for cooling both the compressor rotor and the turbine rotor.

11. A cooling circuit according to claim 10, wherein the cooling air is delivered through a compressor discharge casing to the first cooling path, the first cooling path being defined to direct the cooling air aftward across rotor wheels of the compressor turbine into a bore section of the compressor rotor and then forward to the second cooling path.

* * * * *